(12) United States Patent
Saren

(10) Patent No.: US 7,294,989 B2
(45) Date of Patent: Nov. 13, 2007

(54) FREQUENCY CONVERTER OVERVOLTAGE PROTECTION

(75) Inventor: Hannu Saren, Lappeenranta (FI)

(73) Assignee: Vacon Oyj, Vaasa (FI)

( * ) Notice: Subject to any disclaimer, the term of this patent is extended or adjusted under 35 U.S.C. 154(b) by 70 days.

(21) Appl. No.: 11/269,805

(22) Filed: Nov. 9, 2005

(65) Prior Publication Data

US 2006/0113939 A1    Jun. 1, 2006

(30) Foreign Application Priority Data

Nov. 11, 2004    (FI) ................................. 20041454

(51) Int. Cl.
*H02P 7/00* (2006.01)
*H02P 5/34* (2006.01)

(52) U.S. Cl. .................... 318/805; 318/800; 318/811; 363/34; 363/37

(58) Field of Classification Search ................ 318/138, 318/254, 800–806; 363/41, 34, 37
See application file for complete search history.

(56) References Cited

U.S. PATENT DOCUMENTS

| | | | | |
|---|---|---|---|---|
| 4,814,677 | A * | 3/1989 | Plunkett ..................... | 318/254 |
| 5,481,451 | A | 1/1996 | Kuwahara | |
| 5,585,708 | A * | 12/1996 | Richardson et al. ........ | 318/800 |
| 5,673,196 | A * | 9/1997 | Hoffman et al. ............. | 702/65 |
| 5,905,644 | A * | 5/1999 | Blasko et al. ................. | 363/41 |
| 6,173,236 | B1 * | 1/2001 | Elmore et al. ................ | 702/64 |
| 6,194,856 | B1 * | 2/2001 | Kobayashi et al. ......... | 318/432 |
| 6,693,404 | B2 * | 2/2004 | Hiraga et al. ............... | 318/729 |
| 6,741,063 | B2 * | 5/2004 | Sakai et al. ................. | 318/809 |
| 6,807,074 | B2 * | 10/2004 | Ollila et al. .................. | 363/41 |
| 6,844,700 | B2 * | 1/2005 | Sakai et al. ................. | 318/801 |

(Continued)

FOREIGN PATENT DOCUMENTS

FI    111201 B    6/2003

OTHER PUBLICATIONS

J. Jiang, J. Holtz: J An efficient braking method for controlled AC drives with a diode rectifier front end. Industry Applications Conference, 2000. Conference Record of the 2000 IEEE Oct. 8-12, 2000, Piscataway NJ, USA, pp. 1446-1453. XP010521307. ISBN 0-7803-6401-5.

*Primary Examiner*—Paul Ip
(74) *Attorney, Agent, or Firm*—Birch, Stewart, Kolasch & Birch, LLP

(57) ABSTRACT

A method of protecting a frequency converter against overvoltage by controlling an AC motor during braking or during light load and a frequency converter, wherein the frequency converter is a voltage-controlled PWM frequency converter operating in single quadrant (1Q) and comprising at least one uncontrolled rectifier bridge (10) to be connected to a AC supply line ($U_{L1}$, $U_{L2}$, $U_{L3}$), a direct-voltage intermediate circuit and at least one controlled inverter bridge (11) for feeding an AC motor (12) with an alternating voltage ($U_u$, $U_v$, $U_w$) of varying magnitude and frequency, in which method: the angle ($\theta_A$) between the output voltage vector ($U_s$) and current vector ($I_s$), i.e. the power factor, is measured, the angle ($\theta_A$) between the output voltage vector ($U_s$) and current vector ($I_s$), i.e. the power factor, is controlled on the basis of the measurement, and the angle ($\theta_A$) between the output voltage vector ($U_s$) and current vector ($I_s$), i.e. the power factor, is controlled so that the angle does not exceed a preset threshold value, preferably approximately $\pi/2$.

10 Claims, 2 Drawing Sheets

U.S. PATENT DOCUMENTS

| | | | |
|---|---|---|---|
| 6,850,031 B2* | 2/2005 | Nakata et al. | 318/801 |
| 7,106,024 B2* | 9/2006 | Harbaugh et al. | 318/809 |
| 2003/0020430 A1* | 1/2003 | Hiraga et al. | 318/729 |
| 2003/0020432 A1* | 1/2003 | Sakai et al. | 318/801 |
| 2003/0214827 A1* | 11/2003 | Ollila et al. | 363/132 |
| 2004/0061483 A1* | 4/2004 | Karppinen et al. | 323/207 |
| 2004/0062062 A1* | 4/2004 | Lee et al. | 363/37 |
| 2006/0076914 A1* | 4/2006 | Yaguchi | 318/432 |

* cited by examiner

FREQUENCY CONVERTER OVERVOLTAGE PROTECTION

The present invention relates to a method of protecting a frequency converter against overvoltage. Especially the present invention relates to a method of protecting a voltage source frequency converter operating in single quadrant (1Q) against DC-link overvoltage during braking or during light load of the motor. A single quadrant operation means that motor shaft torque and rotation directions are substantially the same, which means that motor input power is positive most of the time except short braking periods e.g. during stopping the drive when the output frequency needs to be ramped down.

The present invention also relates to a system for protecting a voltage source frequency converter operating in single quadrant (1Q) against over-voltage.

In the DC-link (DC intermediate circuit) of voltage source frequency converters capacitors with relatively large capacitance values are traditionally used to provide stable DC-link voltage and energy storage. Normally electrolytic capacitors are used, which however are quite large and heavy. In many cases the lifetime of the electrolytic capacitor is the main factor that limits the lifetime of the frequency converter. To overcome these problems, capacitor type with relatively low capacitance, e.g. MPFF (Metallized polypropylene film capacitor) can be selected in the DC-link. While overcoming the lifetime problem of the electrolytic capacitor a new problem arises in the form of heavily fluctuating DC-link voltage, because with a very small capacitor every switch turn affects the DC-link voltage.

The rectifier of a frequency converter designed for single quadrant operation is normally a six-pulse diode bridge which cannot lead power back to the supply power line. This is why the voltage in the DC intermediate circuit tends to rise during braking, i.e. when the direction of power flow changes from the motor to the frequency converter. The voltage can in these situations become dangerously high.

Traditionally in single quadrant scalar controlled AC drives the DC-link overvoltage protection is been carried out by measuring the DC-link voltage $U_{DC}$ and controlling the stator voltage vector $U_s$ so that the DC-link voltage remains below the reference limit. $U_s$ can be defined by means of real and imaginary part as well as phase voltages $U_U$, $U_V$ and $U_W$ according to (1):

$$U_s = U_{s,x} + jU_{s,y} \qquad (1)$$
$$= U_U + U_V e^{j\frac{2\pi}{3}} + U_W e^{j\frac{4\pi}{3}}.$$

Figure 1:
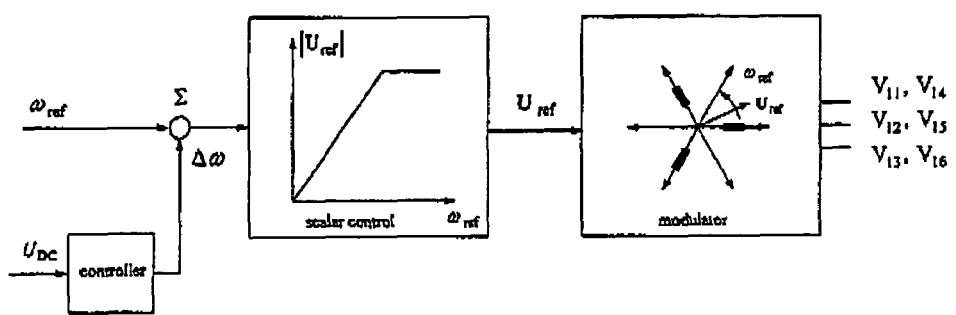

In scalar control the controlled value is the (angular) frequency that controls the stator voltage vector $U_s$. The limitation control principle is shown in FIG. 1. The output signal of the controller is an additional correction angular frequency $\Delta\omega$ to be added into the angular frequency reference $\omega_{ref}$. This system is not good because of too slow response time when small DC-link capacitors are used and the DC-link voltage is not constant, but fluctuates rapidly.

FI-B111201 discloses a voltage-controlled multi-phase PWM frequency converter operating in single quadrant. The frequency converter in this patent is provided with a capacitor with a low capacitance value in the DC intermediate circuit in order to limit the voltage spikes produced in switching situations. In order to prevent the overvoltage during braking the control unit produces an output voltage pulse pattern via the controllable semiconductor switches of the inverter bridge in such manner that, regardless of frequency and load, the output power factor remains above a preset minimum value, with the result that only positive current values appear in the intermediate circuit current. This can be performed for example by lowering the motor voltage in accordance with a pre-calculated voltage curve dependent on frequency and load. By this method, it is possible to keep the power factor continuously above the limit of 0.5, which is critical in several modulation methods.

It is an object of the present invention to provide an improved over-voltage protection method and system for voltage source frequency converters, especially for those with low capacitance DC-link. This method is called dynamic power factor control (DPFC) and it is based on controlling the power factor, which is the angle between the stator voltage and current so that the power never flows from the motor to the frequency converter.

The invented idea is simple to implement and relatively easy to tune. No additional measurements are needed, information of the reference stator voltage vector and the measured stator current are enough.

Characteristic features of the present invention are presented in detail in the enclosed claims.

Figure 2:
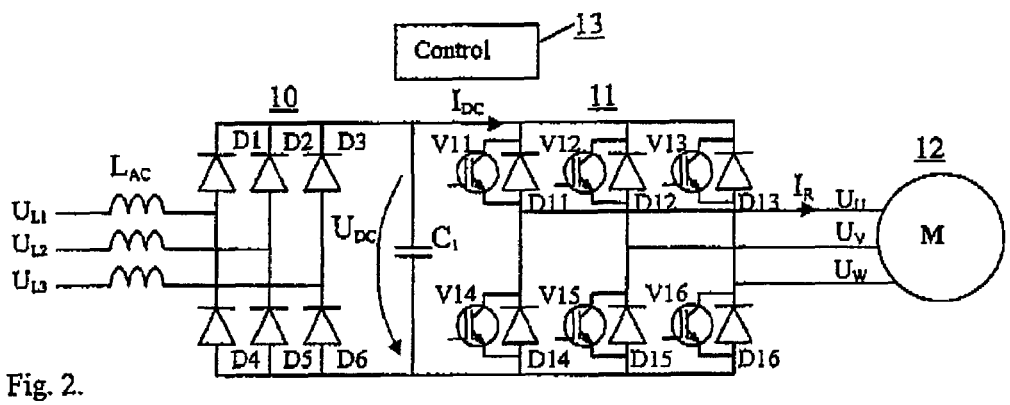
Figure 3:
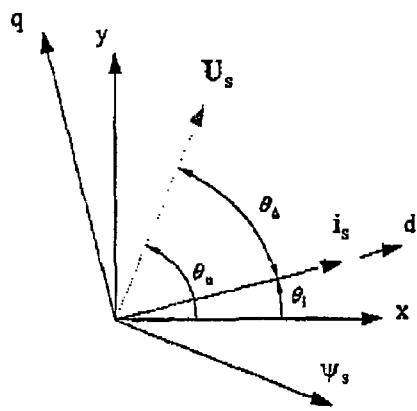
Figure 4:
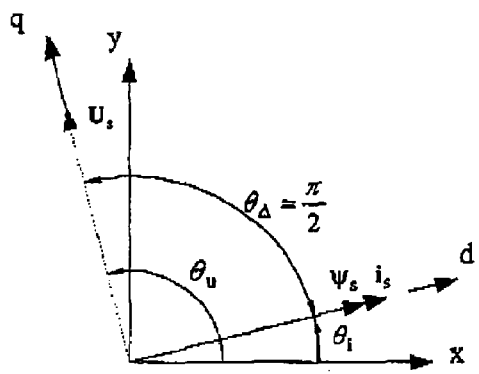
Figure 5:
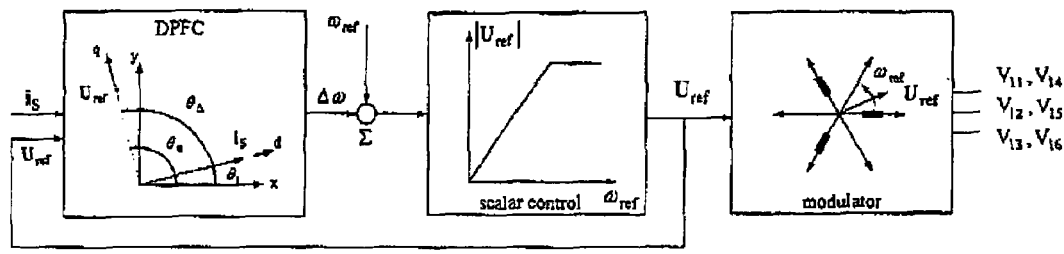

The foregoing, and additional objects, features and advantages of the present invention will be more clearly understood from the following detailed description of preferred embodiments of the present invention, taken in conjunction with accompanying drawings, in which:

FIG. 1 is a block diagram of a system for limiting the DC-link voltage in a prior art scalar control by means of the measured DC-link voltage, FIG. 2 presents a voltage-controlled PWM frequency converter operating in one quadrant, FIG. 3 presents a coordinate system and vector diagram of the stator voltage, the flux linkage and the stator current, FIG. 4 presents a vector diagram of the zero torque situation, and FIG. 5 presents a block diagram of the overvoltage control of scalar control by means of the dynamic power factor control according to the present invention.

FIG. 2 presents an example of a three-phase voltage-controlled PWM frequency converter which comprises a rectifier bridge 10 for the rectification of a three-phase alternating voltage obtained from a supply line comprising phase voltages $U_{L1}$, $U_{L2}$, $U_{L3}$ so as to produce a DC intermediate circuit voltage $U_{DC}$, and an inverter bridge 11 for the inversion of the direct voltage of the DC intermediate circuit so as to produce a variable-frequency three-phase alternating voltage consisting of phase voltages $U_U$, $U_V$, and $U_W$. In such a frequency converter, power can only flow in the direction from the supply line to the load 12 (a three-phase cage induction motor M). The inverter bridge 11 is a full-wave bridge in which a control unit 13 controls the phase switches of each phase via pulse width modulation. "Phase switch" refers to the switch formed by the fully controllable semiconductor switches in the upper and lower arms of each phase (phase U: V11, V14; phase V: V12, V15; phase W: V13, V16; with inverse-parallel connected diodes D11-D16 in parallel with them). The rectifier bridge 10 is an uncontrolled full-wave bridge, consisting of a diode bridge with diodes D1-D6. The rectifier bridge 10 is connected to the inverter bridge 11 directly without a DC capacitor unit acting as an intermediate energy storage, only a capacitor C1 with a low capacitance value is used in the intermediate DC circuit especially in order to limit the voltage spikes produced in switching situations.

The overvoltage protection is performed according to the present invention as follows: A dynamic power factor control (DPFC) is used in scalar control to handle the overvoltage protection. The DPFC method is based on controlling the power factor, that is the angle between stator voltage vector $U_s$ and current vector $i_s$. Mathematical methods to find the angle between stator voltage and current vector can vary. One idea is to fix synchronous rotating dq coordinate frame into the stator current. The vector diagram is shown in FIG. 3. The stator current vector is pointed at the positive direction of d-axes. The stator voltage reference vector $U_s$ is transformed into the dq-frame as well by using equation (2). The angle between stator voltage and current vectors can now be found from (3).

$$\begin{bmatrix} U_{s,d} \\ U_{s,q} \end{bmatrix} = \begin{bmatrix} \cos(\theta_i) & \sin(\theta_i) \\ -\sin(\theta_i) & \cos(\theta_i) \end{bmatrix} \begin{bmatrix} U_{s,x} \\ U_{s,y} \end{bmatrix} \quad (2)$$

$$\theta_\Delta = \tan^{-1}\left(\frac{U_{s,q}}{U_{s,d}}\right) \quad (3)$$

The angle $\theta_\Delta = \theta_u - \theta_i$ between stator voltage and current vectors works as an input for controller. Despite the DC link voltage is heavily fluctuating, the angle $\theta_\Delta$ remains relatively calm in every situation. The situation when power starts to flow from motor to DC-link is when the angle $|\theta_\Delta|$ exceeds $\pi/2$. That is when the torque becomes negative compared to the direct of the rotation. The electric torque $T_e$ of the motor can be calculated from (4)

$$T_e = \psi_s \times i_s, \quad (4)$$

where $\psi_s$ and $i_s$ are stator flux linkage and current respectively.

The zero torque vector diagram is shown in FIG. 4.

As a $\theta_\Delta$ controller 51, a basic PID-controller can be employed. Other type of controllers can also be implemented. The controller should wake up at the moment when the $|\theta_\Delta|=\pi/2$ is exceeded. The output of the PID controller 51, $\Delta\omega$, is summed into the angular frequency reference $\omega_{ref}$ at 52 in the same way as in traditional overvoltage controller. The sum is then used as an input to the scalar controller 53 in order to generate the reference voltage value vector $U_{ref}$. The reference voltage vector is used as a feedback value in addition to the stator current vector is as an input of the PID-controller, and further as an input to the modulator 54 in order to generate the control signals $V_{11}$-$V_{16}$ for the inverter phase switches. The block diagram of the overvoltage control of scalar control by means of dynamic power factor control is shown in FIG. 5.

It is obvious to the person skilled in the art that different embodiments of the invention are not limited to the example described above, but that they may be varied within the scope of the enclosed claims. The present invention is not only limited to frequency converters provided with a capacitor with a low capacitance value in the DC intermediate circuit but can also be applied in frequency converters provided with conventional capacitors with large capacitance values used to provide stable DC-link voltage and energy storage.

The invention claimed is:

1. A method of protecting a frequency converter against overvoltage by controlling an AC motor during braking or during light load,
   wherein the frequency converter is a voltage-controlled PWM frequency converter operating in single quadrant and comprising at least one uncontrolled rectifier bridge to be connected to a AC supply line, a direct-voltage intermediate circuit, at least one controlled inverter bridge for feeding an AC motor with an alternating voltage of varying magnitude and frequency, and a control unit including angular frequency controller, a scalar controller and a PWM modulator,
   the method comprising:
   measuring an angle between the output voltage vector and current vector, in said angular frequency controller,
   controlling the angle between the output voltage vector and current vector, in said PWM modulator on the basis of the measurement, and
   controlling the angle between the output voltage vector and current vector, in said scalar unit so that the angle does not exceed a preset threshold value, of approximately $\pi/2$.

2. A method of protecting a frequency converter controlling an AC motor against overvoltage according to claim 1, wherein said angular frequency controller fixes a synchronous rotating coordinate frame into the stator current.

3. A method of protecting a frequency converter controlling an AC motor against overvoltage according to claim 1, wherein the stator voltage reference vector is transformed into the synchronous rotating coordinate frame by said angular frequency controller as well by using equation (2), and that the angle between stator voltage and current vectors is defined according to equation (3)

$$\begin{bmatrix} U_{s,d} \\ U_{s,q} \end{bmatrix} = \begin{bmatrix} \cos(\theta_i) & \sin(\theta_i) \\ -\sin(\theta_i) & \cos(\theta_i) \end{bmatrix} \begin{bmatrix} U_{s,x} \\ U_{s,y} \end{bmatrix} \quad (2)$$

$$\theta_\Delta = \tan^{-1}\left(\frac{U_{s,q}}{U_{s,d}}\right) \quad (3)$$

wherein the angle between stator voltage and current vectors is an input for the power factor control.

4. A method of protecting a frequency converter controlling an AC motor against overvoltage according to claim 1, wherein the output of the power factor control is summed into an angular frequency reference.

5. A method of protecting a frequency converter controlling an AC motor against overvoltage according to claim 1, wherein the frequency converter is provided with a small capacitor unit in the DC intermediate circuit so that the rectifier bridge and the inverter bridge are connected to each other directly without a direct-voltage capacitor unit acting as an intermediate energy storage.

6. A frequency converter with a protection unit protecting the frequency converter against overvoltage by controlling an ac motor during braking or light load,
   wherein the frequency converter is a voltage-controlled PWM frequency converter operating in single quadrant comprising a control unit with an angular frequency controller, a scalar controller and a PWM modulator,
   wherein the frequency converter further comprises at least one uncontrolled rectifier bridge to be connected to an ac supply line, a direct-voltage intermediate circuit and at least one controlled inverter bridge for feeding an ac motor with an alternating voltage of varying magnitude and frequency,
   wherein:
   the controller measures the angle between the output voltage vector and current vector
   the PWM modulator controls the angle between the output voltage vector and current vector factor on the basis of the measurement, and the scalar controller controls the angle between the output voltage vector and current vector, so that the angle does not exceed a preset threshold value, of approximately $\pi/2$.

7. A frequency converter according to claim 6, wherein the angular frequency converter includes a means for fixing a synchronous rotating coordinate frame into the stator current.

8. A frequency converter according to claim 6, wherein the control unit transforms the stator voltage reference vector into the synchronous rotating coordinate frame as well by using equation (2), and that the angle between stator voltage and current vectors is defined according to equation (3)

$$\begin{bmatrix} U_{s,d} \\ U_{s,q} \end{bmatrix} = \begin{bmatrix} \cos(\theta_i) & \sin(\theta_i) \\ -\sin(\theta_i) & \cos(\theta_i) \end{bmatrix} \begin{bmatrix} U_{s,x} \\ U_{s,y} \end{bmatrix} \quad (2)$$

$$\theta_\Delta = \tan^{-1}\left(\frac{U_{s,q}}{U_{s,d}}\right) \quad (3)$$

wherein the angle between stator voltage and current vectors is an input for the power factor control.

9. A frequency converter according to claim 6, further comprising a means for summing the output of the power factor control into the angular frequency reference.

10. A frequency converter according to claim 6, wherein the frequency converter is provided with a small capacitor unit in the DC intermediate circuit so that the rectifier bridge and the inverter bridge are connected to each other directly without a direct-voltage capacitor unit acting as an intermediate energy storage.

* * * * *